Patented Aug. 17, 1926.

1,596,531

UNITED STATES PATENT OFFICE.

IVAN GUBELMANN, OF SOUTH MILWAUKEE, WISCONSIN, ASSIGNOR TO THE NEWPORT COMPANY, OF CARROLLVILLE, WISCONSIN, A CORPORATION OF DELAWARE.

ANTHRACENE DYE AND A PROCESS OF MANUFACTURE.

No Drawing. Application filed May 9, 1925. Serial No. 29,217.

This invention relates to coloring matters of the anthracene series and a process of making the same, more particularly to the coloring matters obtained by the condensation of a halogenated pyranthrone body with aminodibenzanthrone.

By "amino-dibenzanthrone" is meant the coloring matter obtained from the caustic alkali fusion of benzanthrone and subsequent nitration and reduction. This coloring matter dyes cotton from a hydrosulfite vat, yielding green shades on mild oxidation and black shades on stronger oxidation.

By "pyranthrone" is meant the coloring matter obtained by heating 2, 2'-dimethyl-1, 1'-dianthraquinonyl. This coloring matter dyes cotton from a hydrosulfite vat, yielding orange shades on oxidation. It is known in the chemical arts as pyranthrone and shall hereinafter be referred to by this name.

The condensation reaction between the halogenated pyranthrone body and amino-dibenzanthrone results in a coloring matter of the type

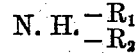

in which $R_1$ represents the pyranthrone complex and $R_2$ the amino-dibenzanthrone, and in the formation of a halogen acid. The reaction proceeds best in the presence of a high boiling solvent at temperatures ranging between 150 and 210° C. Condensation agents such as anhydrous sodium acetate or sodium carbonate and catalyzers such as basic copper acetate may be used to facilitate the reaction.

The following example will serve to illustrate my invention in a preferred form, but I do not wish to limit the process to this example.

Example: Suspend 50 parts by weight of dibrom-pyranthrone in 600 parts by weight of dry nitrobenzol. Add 40 parts by weight of amino-dibenzanthrone, 50 parts by weight of anhydrous sodium acetate in the form of a fine powder, and 10 parts by weight of basic copper acetate as catalyzer. Heat the mixture under agitation to 210° C. for a period of 20 hours. Cool the reaction mixture to 60° C. and add 400 parts by weight of denatured alcohol. Stir the mixture 1 hour and filter off the dark brown reaction product. Wash the filter cake with denatured alcohol and hot water until the solvent and the inorganic salts have been eliminated. After drying and grinding, the reaction product constitutes a dark brown to black powder, which, from a hydrosulfite vat, dyes cotton a dull bluish-violet shade which oxidizes to a rich brown shade on exposure to air or other suitable oxydizing agents.

The product obtained by the reaction between dibrom-pyranthrone and amino-dibenzanthrone is probably best represented by the following formula:

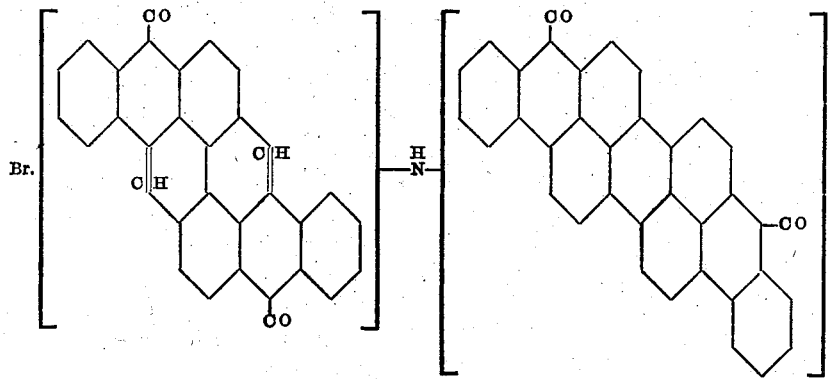

The exact position of the bromine atom remaining in the pyranthrone radicle and of the coupling bond is not known. The second bromine atom unites with one hydrogen atom from the amino group to form hydrobromic acid.

While the temperature specified in the above example is 210° C., I have found that by varying the temperature above and below 210°, various shades of brown product are obtained. The coloring matters thus obtained give shades on dyeing that are extremely fast to washing, light and other influences. The coloring matters themselves are insoluble in hot and cold water, sparingly soluble in dilute acids and organic solvents, but usually more so in organic high boiling solvents. They dissolve in concentrated sulfuric acid, giving a blue to purple color, and they are precipitated out again on dilution with water. They are, however, easily soluble in alkaline hydrosulfite solution.

I am aware that numerous details of the process may be varied through a wide range without departing from the spirit of this invention, and I do not desire limiting the patent granted other than as necessitated by the prior art.

I claim as my invention:

1. The process of producing coloring matters of the anthracene series which consists in heating a halogenated pyranthrone body with amino-dibenzanthrone in the presence of a high boiling solvent and a neutralizing agent.

2. The process of producing coloring matters of the anthracene series, which consists in heating a halogenated pyranthrone body with amino-dibenzanthrone in the presence of a high boiling solvent, a neutralizing agent and copper salts.

3. The process of producing coloring matters of the anthracene series, which consists in heating dibrom-pyranthrone with amino-dibenzanthrone in the presence of a high boiling solvent and a neutralizing agent.

4. The process of producing coloring matters of the anthracene series by heating dibrom-pyranthrone with amino-dibenzanthrone in the presence of a high boiling solvent, anhydrous sodium acetate as a neutralizing agent and a catalyzer.

5. As new articles of manufacture, the coloring matters of the anthracene series which are obtained by heating a halogenated pyranthrone body with amino-dibenzanthrone.

6. As new articles of manufacture, the coloring matters of the anthracene series which are obtained by heating a brominated pyranthrone body with amino-dibenzanthrone.

7. The process of producing coloring matters of the anthracene series which consists in heating a halogenated pyranthrone body with amino-dibenzanthrone.

8. As a new article of manufacture, coloring matters of the anthracene series having most probably the following general formula:

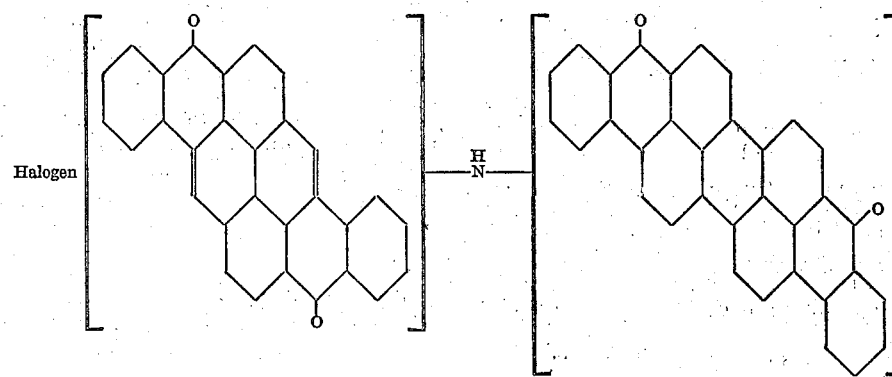

said coloring matters being in general dark brown powders, which, from a hydrosulfite vat, dye cotton a violet shade, which shade oxidizes to a rich brown shade on exposure to air or other oxidizing agents.

9. As new articles of manufacture, coloring matters of the anthracene series having most probably the following formula:

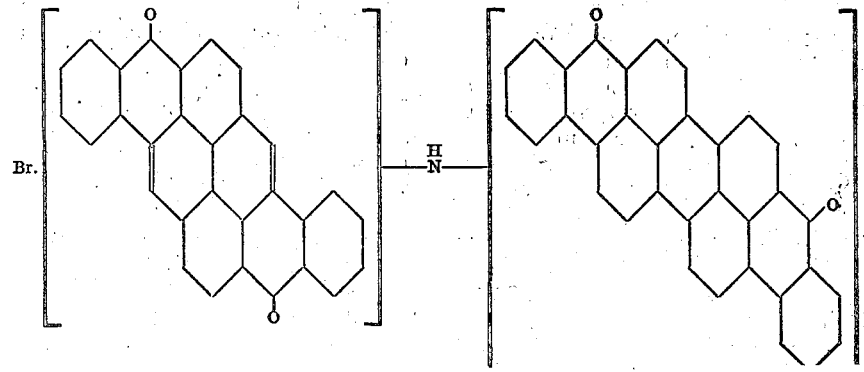

said coloring matters being in general dark brown powders, which, from a hydrosulfite vat, dye cotton a violet shade, which shade oxidizes to a rich brown shade on exposure to air or other oxidizing agents.

10. Materials dyed with coloring matters described in claim 8.

11. Materials dyed with coloring matters described in claim 9.

In testimony whereof I have hereunto subscribed my name.

IVAN GUBELMANN.